(12) United States Patent
Zhao et al.

(10) Patent No.: US 12,548,801 B2
(45) Date of Patent: Feb. 10, 2026

(54) SINGLE BATTERY, BATTERY APPARATUS AND POWER CONSUMPTION APPARATUS

(71) Applicant: CALB Co., Ltd., Suzhou (CN)

(72) Inventors: Dong Zhao, Changzhou (CN); Yuyang Shen, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 534 days.

(21) Appl. No.: 18/150,788

(22) Filed: Jan. 5, 2023

(65) Prior Publication Data

US 2024/0055668 A1  Feb. 15, 2024

(30) Foreign Application Priority Data

Aug. 15, 2022 (CN) .......................... 202210972163.0

(51) Int. Cl.
*H01M 10/0587* (2010.01)
*H01M 10/0525* (2010.01)

(52) U.S. Cl.
CPC .... *H01M 10/0587* (2013.01); *H01M 10/0525* (2013.01)

(58) Field of Classification Search
CPC ......... H01M 10/0587; H01M 10/0525; H01M 10/0431; Y02P 70/50
See application file for complete search history.

(56) References Cited

U.S. PATENT DOCUMENTS

| | | | | |
|---|---|---|---|---|
| 2011/0052976 A1* | 3/2011 | Ishii | ..................... | H01M 50/533 429/178 |
| 2015/0072204 A1* | 3/2015 | Kwon | ................. | H01M 50/538 429/94 |
| 2015/0236369 A1* | 8/2015 | Takatsuka | ........... | H01M 50/533 429/94 |
| 2016/0043373 A1* | 2/2016 | Arishima | .............. | H01M 50/46 429/246 |
| 2016/0254569 A1* | 9/2016 | Yagi | ...................... | H01M 4/139 429/94 |
| 2023/0178847 A1* | 6/2023 | Lim | .................... | H01M 50/204 429/53 |

FOREIGN PATENT DOCUMENTS

| | | |
|---|---|---|
| CN | 104966852 | 10/2015 |
| CN | 111769334 | 10/2020 |
| CN | 215988907 | 3/2022 |
| CN | 114759272 | 7/2022 |
| JP | 5882697 | 3/2016 |

OTHER PUBLICATIONS

"Search Report of Europe Counterpart Application", issued on Aug. 30, 2023, p. 1-p. 8.
"Office Action of China Counterpart Application", issued on Sep. 21, 2022, with partial English translation thereof, pp. 1-8.

* cited by examiner

*Primary Examiner* — Muhammad S Siddiquee
(74) *Attorney, Agent, or Firm* — JCIP GLOBAL INC.

(57) ABSTRACT

A single battery, a battery apparatus, and a power consumption apparatus are provided. The single battery includes a casing having an accommodating cavity and at least one winding core accommodated in the accommodating cavity. The winding core includes a positive electrode piece, a negative electrode piece, and a separator. After being laminated, the winding core is formed with flat surfaces opposite to each other and corner regions connected to two sides of the opposite flat surfaces. A distance between the flat surfaces opposite to each other is h. Four endpoints connecting the opposite flat surfaces and the corner regions and the opposite flat surfaces surround and form a middle region. The middle region has a rectangular structure. A length of the middle region in a winding direction is d, and a maximum thickness of each of the corner regions in the winding direction is a, where $0.015 \leq 2a^2/dh \leq 0.1$.

8 Claims, 2 Drawing Sheets

SINGLE BATTERY, BATTERY APPARATUS AND POWER CONSUMPTION APPARATUS

CROSS-REFERENCE TO RELATED APPLICATION

This application claims the priority of China patent application serial no. 202210972163.0, filed on Aug. 15, 2022. The entirety of the above-mentioned patent application is hereby incorporated by reference herein and made a part of this specification.

BACKGROUND

Technical Field

The disclosure relates to the technical field of batteries, and in particular, relates to a single battery, a battery apparatus, and a power consumption apparatus.

Description of Related Art

With the development of various electronic products, the demand for lithium-ion batteries is growing rapidly. A lithium-ion battery is a secondary battery capable of cyclic charging and discharging. Generally, a lithium-ion single battery includes a packaging casing, a winding core, and an electrolyte. The winding core includes a positive electrode piece, a negative electrode piece, and a separator. The process of charging and discharging is achieved by lithium ions in the electrolyte moving back and forth between the positive electrode piece and the negative electrode piece.

In the preparation process of the winding core, after the positive electrode piece and the negative electrode piece are separated by the separator, the winding core is formed by winding with a needle and then is subjected to thermoforming. However, at present, due to the mismatch between the core forming structure and the transmission rate of Li ions in different regions in the winding core, the Li ion transmission rate is slow during the use of the lithium ion battery. The overall rate performance and energy density of the battery are thereby affected.

SUMMARY

A single battery is provided. The single battery is a quadrangular prismatic battery and includes a casing and at least one winding core. The casing has an accommodating cavity. The winding core is accommodated in the accommodating cavity. The winding core includes a positive electrode piece, a negative electrode piece, and a separator, and the separator is arranged between the positive electrode piece and the negative electrode piece. After being laminated, the winding core is formed with flat surfaces opposite to each other and corner regions connected to two sides of the opposite flat surfaces. A distance between the flat surfaces opposite to each other is h. Four endpoints connecting the opposite flat surfaces and the corner regions and the opposite flat surfaces surround and form a middle region. The middle region has a rectangular structure. A length of the middle region in a winding direction is d, and a maximum thickness of each of the corner regions in the winding direction is a, where $0.015 \leq 2a^2/dh \leq 0.1$.

In another aspect of the disclosure, a battery apparatus including the abovementioned single battery is provided.

In still another aspect of the disclosure, the disclosure further provides a power consumption apparatus including the abovementioned battery apparatus.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
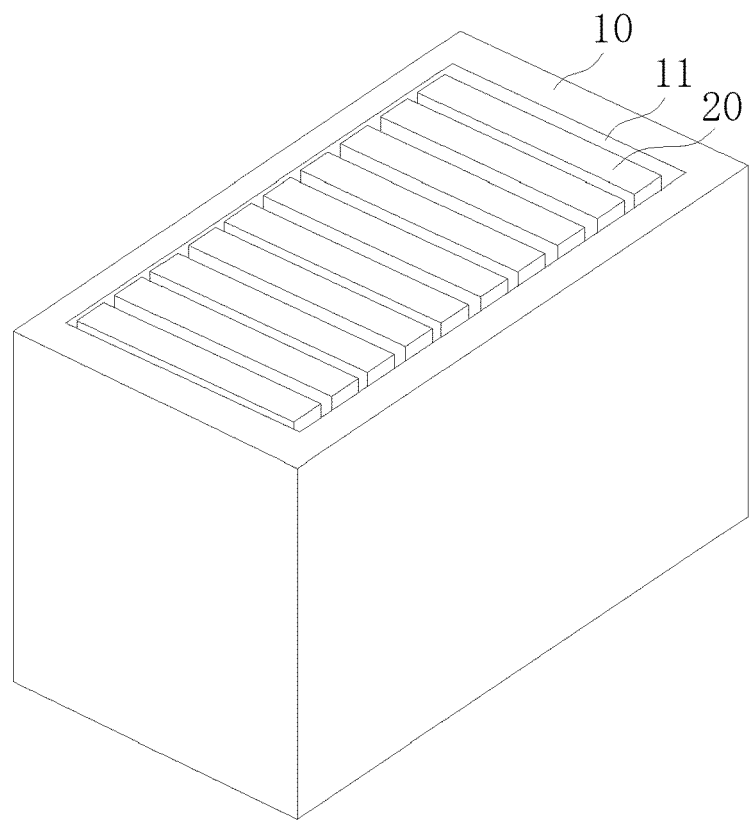
FIG. 1 is a schematic structural view of a single battery according to an embodiment of the disclosure.
Figure 2:
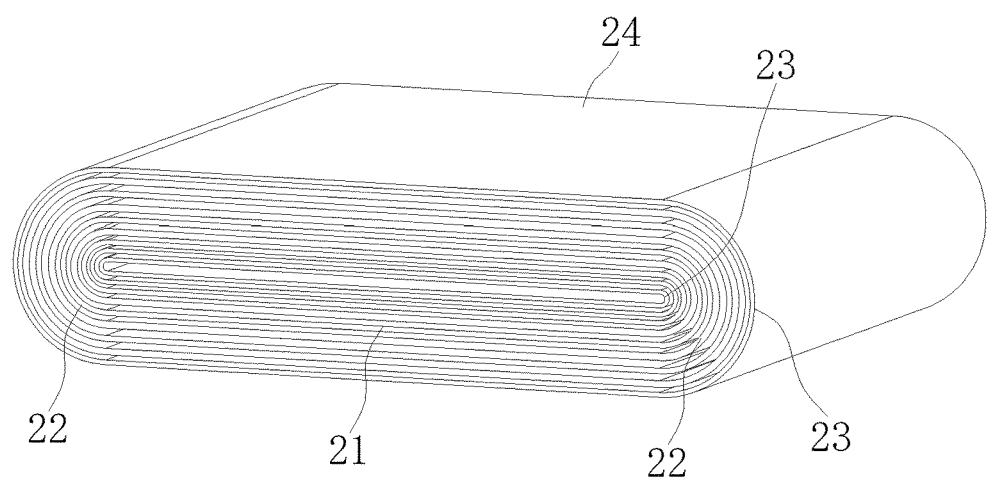
FIG. 2 is a schematic three-dimensional view of a winding core shown in FIG. 1.
Figure 3:
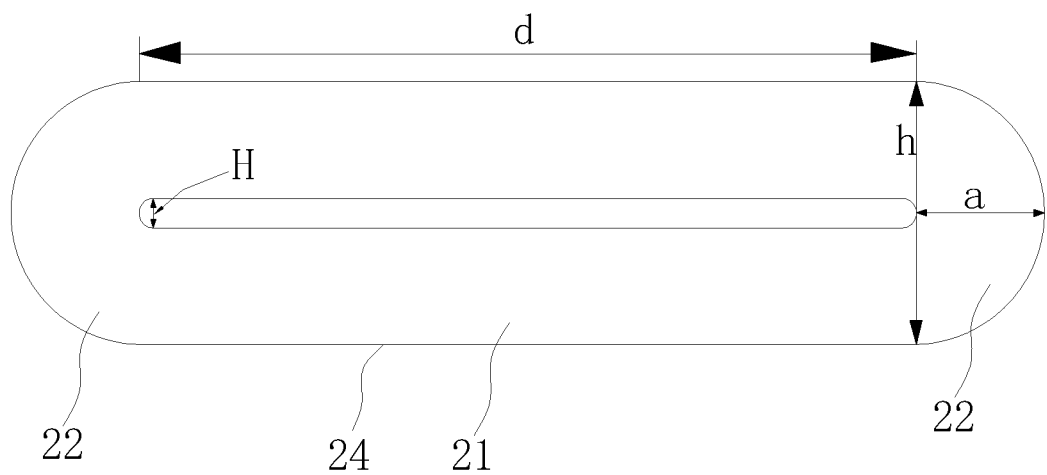
FIG. 3 is a schematic structural view of the winding core shown in FIG. 2.

With reference to FIG. 1 to FIG. 3, the first embodiment of the disclosure provides a single battery 100 including a casing 10 and at least one winding core 20 accommodated in the casing 10.

Herein, the single battery 100 provided in this embodiment is a prism-shaped battery. The casing 10 has an accommodating cavity 11, and the at least one winding core 20 is accommodated in the accommodating cavity 11. The winding core 20 includes a positive electrode piece, a negative electrode piece, and a separator 23, and the separator 23 is arranged between the positive electrode piece and the negative electrode piece. After being laminated, the winding core 20 is formed with flat surfaces 24 opposite to each other and corner regions 22 connected to two sides of the opposite flat surfaces 24. A distance between the flat surfaces 24 opposite to each other is h. Four endpoints connecting the opposite flat surfaces 24 and the corner regions 22 and the opposite flat surfaces 24 surround and form a middle region 21. The middle region 21 has a rectangular structure. A length of the middle region 21 in a winding direction is d, and a maximum thickness of each of the corner regions 22 in the winding direction is a, where $0.015 \leq 2a^2/dh \leq 0.1$.

In the single battery 100, a sum of areas of the two corner regions 22 in a single winding core 20 is approximately $2a^2$, and an area of the middle region 21 is dh. By controlling the ratio of $2a^2/dh$ to be between 0.015 and 0.1, the area of the corner area 22 is controlled to be neither excessively large nor excessively small and is controlled to be within an appropriate range. In this way, the problems of the overall energy density and the overall rate performance of the single battery 100 being affected are prevented from occurring because these problems may occur when the ratio of the area of the corner region 22 to the area of the middle region 21 is excessively small, which may cause the winding core 20 to be insufficiently compressed, so that the transmission rate of Li ions in the middle region 21 becomes relatively slower, and the overall energy density and the overall rate performance of the single battery 100 are thus affected. Further, by controlling the ratio of $2a^2/dh$ to be between 0.015 and 0.1, the corner region 22 is not be close to a right angle, and the situation that the winding core 20 is difficult to install inside the casing 10 is prevented from occurring. Further, by controlling the ratio of $2a^2/dh$ to be between 0.015 and 0.1, the ratio of the area of the corner region 22 to the area of the middle region 21 is prevented from being excessively large. In this way, the problems of poor overall energy density and poor overall rate performance of the single battery 100 are prevented from occurring because these problems may occur when the corner region 22 has a relatively large proportion, which may result in the transmission rate of Li ions in the corner region 22 being relatively slower, so that the electricity at the corner cannot be well released, and the single battery 100 may exhibit poor overall energy density and poor overall rate performance as a result. Further, the problem of the safety inside a cell being affected is also prevented from occurring because this problem may occur when the ratio of the area of the corner region 22 to the area of the middle region 21 is excessively large, which means that an excessively large amount of compression is applied on the winding core 20, and since the winding core 20 is excessively compressed, it is difficult for the cell to swell during charging and discharging, internal gas may thus be considerably generated, and the safety inside the cell is affected. Further, the electrode pieces at the corners being prone to powder loss due to excessive compression and the phenomenon of lithium precipitation are also prevented from occurring.

In a preferred embodiment of the disclosure, $0.02 \leq 2a^2/dh \leq 0.08$, and therefore, the area of each corner region 22 is kept within an appropriate range herein, and the values of a, h, and d are kept within an appropriate range. The winding core 20 has sufficient compression to ensure the Li ion transmission rate in the corner region 22. Therefore, the overall energy density and rate performance of the entire single battery 100 are ensured, and the safety of the entire battery during use is also ensured. During the charging and discharging process of the cell, expansion can be carried out, and the problem of internal gas filling is thus prevented from occurring.

Herein, 100 mm $\leq$ d $\leq$ 300 mm is controlled in this embodiment. In this way, it is ensured that the cell has a certain thickness, and the transmission rate of Li ions in the middle region 21 is ensured, so that the overall energy density and rate performance of the single battery 100 are ensured.

In an embodiment of the disclosure, a swelling rate of the winding core is x, and a maximum swelling thickness of the single battery 100 is h1, where $0.01 < 2a^2(1+x)n/dh1 < 0.05$ and $10\% \leq x \leq 40\%$. Herein, the maximum swelling thickness of the single battery 100 refers to the maximum thickness that the single battery 100 can swell in a thickness direction of the single battery 100 when the single battery 100 is heated. Therefore, the relationship between the a value, the h value, and the swelling rate x of the winding core 20 is kept within the range of the above relational expression, so that the swelling of the cell is kept within an appropriate range. As such, the problem of a short circuit inside the winding core 20 is prevented from occurring because this problem may occur when the cell excessively swells, and as a result, the cell at the corner is under greater stress, and the separator at the corner may be broken due to stress concentration, causing a short circuit inside the winding core 20. Further, the problem of space utilization is also prevented from occurring because this problem may occur when the cell insufficiently swells because the volume of the cell becomes excessively small, and since the cell occupies only a small space inside the battery, the utilization of the internal space of the battery is affected. With reference to FIG. 2 and FIG. 3, in an embodiment of the disclosure, the winding core 20 is a hollow structure, and the hollow structure has a racetrack shape. Herein, the hollow structure has a height H. As such, the thermoforming after the positive electrode piece, the negative electrode piece, and the separator are wound and formed may be conveniently performed. Further, the racetrack-shaped hollow structure may also be matched with the shapes of the corner regions 22 and the middle region 21. That is, the circular arc ends on both sides of the racetrack-shaped hollow structure are correspondingly located in the corner regions 22, and the square-shaped middle part of the hollow structure is correspondingly located in the middle region 21. Therefore, the racetrack-shaped hollow structure is matched with the structure of the winding core 20. That is, the corner regions 22 are made into arc-shaped structures, and the arc-shaped corner regions 22 are convenient for the winding core 20 to be installed into the casing, and the corner regions are also prevented from being crushed when the winding core 20 is assembled into the casing. Therefore, the material loss of the electrode pieces and the situation of lithium precipitation caused by compression at the corners are prevented from occurring, and the service life of the battery is thus prolonged.

To be specific, the height H of the hollow structure in this embodiment is between 0.001 mm and 1.0 mm. By configuring the height H of the hollow structure to be within this range, the risk of a short circuit inside the battery is prevented from occurring because this risk may occur when the height H of the hollow structure is set to be excessively small, the problems of serious compression of the winding core 20 and lithium precipitation at the corners of the winding core 20 may occur, resulting in the risk of a short circuit inside the battery. The problem of low space utilization among winding cores 20 is also prevented from occurring because this problem may occur when the height H of the hollow structure is configured to be excessively large, which may result in insufficient compression of the winding cores 20 and thus leads to low space utilization among winding cores 20. Further, when the height H of the hollow structure is configured to be excessively large, the distance between the positive electrode piece and the negative electrode piece is large, which may easily lead to a slow ion migration rate, so that the charging and discharging rates of the battery and the overall energy density of the battery may all be affected.

To be specific, since the innermost layer and the outermost layer of the winding core 20 are both the separator 23 during forming, the value a refers to the distance between the innermost separator 23 and the outermost separator 23 in this embodiment. The height H of the hollow structure refers to the distance between the innermost separator 23.

Herein, in this embodiment, the corner regions 22 and the middle region 21 transition smoothly, and the corner regions 22 may be elliptical arcs or circular arcs. Therefore, by arranging the corner regions 22 to smoothly transition relative to the middle region 21, the corner regions 22 have a specific radius of curvature. The material loss of the electrode pieces caused by excessive bending and compression at the corners is improved, lithium precipitation at the corners during the cycle may be effectively prevented from occurring, and the cycle performance of the cell is enhanced.

To be specific, when the arc edge of each corner region 22 is an arc, the central angle of the arc ranges from 30° to 150°. That is, when the central angle of the arc is 30°, the pressure of the winding core 20 being hot-pressed is relatively high, and the height of the middle region 21 is relatively small. When the central angle of the arc is 150°, the pressure applied to the winding core 20 during thermoforming is relatively small, so that the height of the middle region 21 is relatively large. Further, by configuring the central angle of each corner region 22 to be within the range of 30° to 150°, it is ensured that $0.015 \leq 2a^2/dh \leq 0.1$. Therefore, the Li ions in the corner region 22 can have an appropriate transmission rate, so that the electricity at the corner is well released.

In addition, the inside and outside of the winding core 20 in this embodiment are both the separator 23. That is, the outermost layer is also set as the separator 23 to wrap the positive electrode piece and the negative electrode piece inside the winding core 20, which facilitates the transmission of Li ions and protects the positive electrode piece and the negative electrode piece.

In an embodiment of the disclosure, the single battery 100 is a quadrangular prismatic battery. Therefore, a battery module may be conveniently installed and formed, and single batteries may be closely attached to each other so as to make full use of the space in the box of the battery module. Therefore, there can be a sufficient number of single batteries 100 in the battery module to ensure the energy density of the battery module.

Herein, the preparation processes of the positive electrode piece and the negative electrode piece in the present embodiment are provided as follows.

(1) Preparation of the positive electrode piece: The positive electrode active material lithium cobaltate, the conductive agent acetylene black, and the binder polyvinylidene fluoride (PVDF) are uniformly mixed according to a certain mass ratio and added to the solvent N-methyl-2-pyrrolidone (NMP) to prepare a positive electrode slurry with a certain viscosity. The positive electrode slurry is evenly coated on the aluminum foil of a positive electrode current collector, dried at a high temperature, cold pressed, and slit into strips to make the positive electrode piece of the battery. An aluminum tab may be welded at the head position of the positive electrode current collector.

(2) Preparation of the negative electrode piece: The negative electrode active material graphite, the conductive agent acetylene black, the thickener sodium hydroxymethyl cellulose (NaCMC), and the binder styrene-butadiene rubber (SBR) are uniformly mixed according to a certain mass ratio to prepare a negative electrode slurry of the battery. The negative electrode slurry is evenly coated on the copper foil of a negative electrode current collector, dried at a high temperature, cold pressed, and slit into strips to make the negative electrode piece of the battery. A nickel electrode is welded at the head position of the negative electrode current collector.

To be specific, the preparation process of the cell in this embodiment is provided as follows.

(1) The positive electrode piece, the separator, and the negative electrode piece are wound by winding a needle to initially form the winding core, and the innermost layer of the winding core is the separator and the outermost layer is the separator.

(2) The end of the separator is pasted with a tape to ensure that the shape of the initially formed winding core will fall apart.

(3) The winding core is placed on a hot-pressing platform, the temperature of the hot-pressing platform and the temperature of the hot-pressing plate are adjusted in the range of 70° C. to 120° C., and the pressure of a hot-pressing machine is adjusted at the same time. Therefore, by increasing the pressure of the hot-pressing machine and raising the temperature of the hot-pressing plate, the overall compaction of the positive electrode piece, the negative electrode piece, and the separator in the winding core is achieved.

In this way, the thickness of the winding core 20 is reduced by compacting the initially formed winding core 20, so as to increase the ion transmission rate between the positive electrode piece and the negative electrode piece after liquid injection. Further, after the single battery 100 is assembled, the overall energy density and rate performance of the single battery 100 may be guaranteed.

In addition, in other embodiments, the compaction of the winding core 20 may also be achieved by adjusting parameters such as the particle size of the coating material on the separator and the elastic modulus of the separator.

After the hot pressing of the winding core is completed, next, the prepared winding core is sequentially packaged with an aluminum-plastic film, injected with liquid, and sealed to obtain a cell. Afterwards, the prepared cell is tested.

To be specific, the power density and energy density of the cell are tested.

1. The cell is placed in a constant temperature box at 25° C., and the cell is charged with a constant current of 1C to 4.2V using an arbin battery test cabinet, and then charged at a constant voltage until the cut-off current is 0.05C. After that, the cell is discharged to 3.0V with a constant current of 1C, and the discharge energy and discharge time of the cell are obtained from the test computer.

2. The cell is weighed with an electronic balance with an accuracy of 0.01 g, the weight of the cell is obtained, and the weight of the cell is recorded.

3. The discharge energy of the cell is divided by the weight of the battery to obtain the energy density of the battery. The discharge energy of the cell/(discharge time weight) is calculated to obtain the power density of the battery.

To be specific, with reference to the following table, the following table shows the calculation data of different a values, h values, and d values corresponding to different power densities and energy densities.

| | a | h | d | $2a^2/dh$ | Power Density | Energy Density |
|---|---|---|---|---|---|---|
| Examples of the Technical Solutions | | | | | | |
| 1 | 6 | 11 | 433 | 0.0151 | 1109 | 136 |
| 2 | 6 | 11 | 400 | 0.0164 | 1312 | 167 |
| 3 | 6 | 11 | 380 | 0.0172 | 1200 | 145 |
| 4 | 6 | 11 | 300 | 0.0218 | 1100 | 135 |
| 5 | 6 | 11 | 280 | 0.0234 | 910 | 127 |
| 6 | 6 | 11 | 170 | 0.0385 | 820 | 123 |
| 7 | 6 | 11 | 140 | 0.0468 | 760 | 117 |
| 8 | 6 | 11 | 132 | 0.0496 | 720 | 113 |
| 9 | 6 | 11 | 100 | 0.0655 | 670 | 112 |
| 10 | 6 | 11 | 70 | 0.0935 | 660 | 108 |
| 11 | 6 | 11 | 66 | 0.0992 | 650 | 105 |
| 12 | 24.2 | 48 | 280 | 0.0871 | 2300 | 287 |
| 13 | 24.6 | 48 | 280 | 0.0900 | 2208 | 276 |
| 14 | 25 | 48 | 280 | 0.0930 | 2167 | 265 |
| 15 | 25.2 | 48 | 280 | 0.0945 | 2012 | 261 |
| 16 | 25.8 | 48 | 280 | 0.0991 | 1078 | 176 |
| 17 | 25 | 47 | 280 | 0.0950 | 1987 | 231 |
| 18 | 25 | 47.4 | 280 | 0.0941 | 1996 | 243 |
| 19 | 25 | 47.8 | 280 | 0.0934 | 1978 | 221 |
| 20 | 25 | 47.9 | 280 | 0.0932 | 1876 | 209 |
| 21 | 25 | 48 | 280 | 0.0930 | 1930 | 236 |
| 22 | 25 | 49 | 280 | 0.0911 | 2109 | 263 |
| Comparative Examples | | | | | | |
| 1 | 6 | 11 | 440 | 0.0149 | 400 | 80 |
| 2 | 6 | 11 | 60 | 0.1091 | 240 | 54 |
| 3 | 30 | 48 | 280 | 0.1339 | 330 | 76 |
| 4 | 10 | 48 | 280 | 0.0149 | 310 | 72 |

The following can be observed from the above table.

(1) It can be seen from Examples 1 to 11 that when the values of a and h are constant, the value of $2a^2/dh$ is constantly increasing as the value of d is decreasing, that is, as the thickness of the winding core 20 is constantly decreasing. Further, the value of $2a^2/dh$ ranges between 0.015 and 0.1, with decreasing power density and energy density.

(2) It can be seen from Examples 12 to 16 that when the values of h and d are constant, the value of $2a^2/dh$ is constantly increasing as the value of a is constantly increasing, that is, the width of the corner region 22 is constantly increasing. Further, the value of $2a^2/dh$ ranges between 0.015 and 0.1, with decreasing power density and energy density.

(3) It can be seen from Examples 17 to 22 that when the values of a and d are constant, the value of $2a^2/dh$ is constantly decreasing as the value of h is increasing, that is, as the thickness of the winding core 20 is constantly increasing. Further, the value of $2a^2/dh$ ranges between 0.015 and 0.1, with decreasing power density and energy density.

(4) It can be seen from Examples 1 to 22 that when $24<a<26$, $48<h\leq50$, and $280<h\leq300$, the power density and energy density of the cell are within the maximum range.

Comparison with comparative examples is provided as follows.

(1) It can be seen from Example 1 and Comparative Example 1 that when the values of a and h are the same, and the value of d is greater than 435 mm, that is, when the width of the middle region 21 is larger, the power density and energy density of the cell are less than those in Examples 1 to 22. Therefore, when hot pressing is performed on the winding core 20, the value range of the width d of the middle region 21 shall be controlled to be within 435 mm, that is, the thickness of the cell shall be kept smaller, so as to ensure the power density and energy density of the cell.

(2) It can be seen from Example 2 and Comparative Example 1 that although the value range of d is controlled to be within 435 mm, when d is reduced to a smaller value, that is, the width of the middle region 21 is smaller, the value of $2a^2/dh$ is >0.1, and the values of the power density and energy density of the cell are less than the data in Examples 1 to 22. Therefore, when hot pressing is performed on the winding core 20, the value range of the width d of the middle region 21 shall be controlled to be greater than 60 mm, that is, $60<d\leq435$ mm, so as to ensure the power density and energy density of the cell.

(3) It can be seen from the data of Comparative Examples 1 to 4 and Examples 1 to 22, when the value of $2a^2/dh>0.1$, the obtained power density and energy density can be smaller. Therefore, in order to ensure the power density and energy density of the cell, it shall be ensured that the ratio of $2a^2/dh$ is less than 0.1 and greater than 0.015, so as to ensure that the cell has sufficient power density and energy density.

(4) In order to ensure that the cell has sufficient power density and energy density, $0.02\leq2a^2/dh\leq0.08$, and the corresponding value of the width d of the middle region 21 ranges between 100 mm and 300 mm, by limiting the width of the middle region 21, the ratio of the a value to the h value can be ensured, so as to ensure that the lithium ions in the corner regions 22 have a relatively high transmission rate.

Besides, in the second embodiment, the disclosure further provides a battery apparatus including the abovementioned single battery 100.

Regarding the battery apparatus, since the single battery in the battery apparatus has relatively high power density and energy density, it can ensure that the battery apparatus has sufficient power density and energy density.

Further, in the third embodiment, the disclosure further provides a power consumption apparatus including the battery apparatus.

Regarding the power consumption apparatus, since the battery apparatus used has a large power density and energy density, the convenience of using the power consumption apparatus is improved, and the user experience is enhanced.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A single battery, wherein the single battery is a prism-shaped battery and comprises:
a casing having an accommodating cavity; and
at least one winding core accommodated in the accommodating cavity, the at least one winding core comprises a positive electrode piece, a negative electrode piece, and a separator, the separator is arranged between the positive electrode piece and the negative electrode piece, after being laminated, the at least one winding core is formed with flat surfaces opposite to each other and corner regions connected to two sides of the opposite flat surfaces, a distance between the flat surfaces opposite to each other is h, four endpoints connecting the opposite flat surfaces and the corner regions and the opposite flat surfaces surround and form a middle region, the middle region has a rectangular structure, a length of the middle region in a winding direction is d, and a maximum thickness of each of the corner regions in the winding direction is a, wherein $0.02 \leq 2a^2/dh \leq 0.08$ and 100 mm$\leq$d$\leq$300 mm.

2. The single battery according to claim 1, wherein a swelling rate of the at least one winding core is x, and a maximum swelling thickness of the single battery is h1, where $0.01 < 2a^2(1+x)n/dh1 < 0.05$ and 10%$\leq$x$\leq$40%.

3. The single battery according to claim 1, wherein an arc edge of each of the corner regions is an elliptical arc or a circular arc.

4. The single battery according to claim 3, wherein the at least one winding core is a hollow structure, and the hollow structure has a racetrack shape.

5. The single battery according to claim 4, wherein a height of the hollow structure is between 0.001 mm and 1.0 mm.

6. The single battery according to claim 1, wherein the single battery is a quadrangular prismatic battery.

7. A battery apparatus, comprising the single battery according to claim 1.

8. A power consumption apparatus, comprising the battery apparatus according to claim 7.

* * * * *